United States Patent [19]

Epner

[11] Patent Number: 4,768,861
[45] Date of Patent: Sep. 6, 1988

[54] METHOD OF FABRICATION OF MULTI-FACETED SCANNER MIRRORS

[75] Inventor: David Epner, Brooklyn, N.Y.

[73] Assignee: Epner Technology Incorporated, New York, N.Y.

[21] Appl. No.: 30,672

[22] Filed: Mar. 25, 1987

[51] Int. Cl.⁴ .................................................. G02B 7/18
[52] U.S. Cl. ..................................... 350/320; 350/616; 350/6.8
[58] Field of Search .................. 350/320, 6.5, 6.8, 616; 250/563, 556, 236; 235/467

[56] References Cited

U.S. PATENT DOCUMENTS

| | | |
|---|---|---|
| 3,657,792 | 4/1972 | Hug et al. .............................. 350/320 |
| 4,021,897 | 5/1977 | Fisli ...................................... 350/616 |
| 4,277,141 | 7/1981 | Kleiber ................................. 350/320 |
| 4,367,014 | 1/1983 | Howden ............................... 350/320 |

Primary Examiner—John K. Corbin
Assistant Examiner—Loha Ben
Attorney, Agent, or Firm—Darby & Darby

[57] ABSTRACT

A process is disclosed for fabricating multi-faceted scanner mirrors, such as for use in visible light or infrared scanner, which advantageously provides improved optical quality and significant manufacturing time and cost savings over prior art processes by rough-forming the complete mirror with a plurality of facets, severing individual facets, polishing the severed facets, and reassembling the facets into a complete mirror.

13 Claims, 2 Drawing Sheets

METHOD OF FABRICATION OF MULTI-FACETED SCANNER MIRRORS

BACKGROUND OF THE INVENTION

1. Field of the Invention

This invention is directed to fabrication methods for producing multi-faceted scanner mirrors, particularly adapted for inner-scanners.

2. Description of the Prior Art

Multi-faceted scanner mirrors have become a predominant requirement for the design and manufacture of a cost-effective electro-optical scan system. One use of such a mirror is shown in Maddox et al U.S. Pat. No. 3,971,917, issued July 27, 1976 for "Labels and Label Readers", showing an outside-faceted scanner mirror for scanning labels.

Basically a multi-faceted scanner mirror consists of different reflecting facets on a rigid unit (such as of copper or beryllium copper), positioned so that the facets collectively define the scene to be scanned. Each facet has a specified pyramidal angle at a given rotational angle, with some facets sometimes formed to interlace with the scan of others.

One of the problems facing production of multi-faceted mirror scanners is to assure that each facet is highly polished and flat, with sufficient reflectance, and to position each facet precisely in relation to the incident light beam, so as to reflect the beam efficiently and precisely toward the predetermined target point. One arrangement for doing so is described in Hug U.S. Pat. No. 3,781,079 issued Dec. 25, 1973, which requires adjusting each facet individually by a separate action to cause the beam to be reflected precisely toward the target point.

Maddox U.S. Pat. No. 3,972,917 shows a faceted mirror in the form of a drum. The mirror forming each of the facets is secured to a flat surface on the circumference of the drum by screws and washers. Each mirror is mounted upon a resiliently depressible adhesive, and the angular relationship of each mirror to its support is adjusted by the mounting screws to distort the depressible adhesive in order to properly orient the facet.

Another prior art procedure which has unsuccessfully attempted to solve the problem of facet orientation is a bonded built-up-facet process by which stainless steel sheet metal pieces are formed into individual facets, which are polished by lapping to provide facets of the required individual size, shape, surface finish and figure. The individual facets are then bonded to a main frame or ring that is formed to hold the individual facets with the required pyramidal and rotational angle dimensions. However, this process suffers from several major disadvantages: among others, it is labor intensive, requiring highly trained precision work; the adhesive for secure bonding requires substantial time for curing; the product is subject to problems of "peel off" during subsequent fabrication or use.

Accordingly, a relatively inexpensive and simple method of fabrication for producing a reliable high precision multi-faceted scanner mirror with excellent reflectance has been required.

Scanner mirrors have been manufactured using either of two known approaches, namely, the "Milling/Single-Point Diamond Flycutting" process and the "Wire EDM/Single-Point Diamond Flycutting" process, as discussed below in greater detail. Each process possesses drawbacks; in particular, use of the single-point diamond flycutting in either process, is relatively expensive in that it requires the use of single-point diamond cutter tools and specialized machine tools to produce the required optical "figure" and high finish. The material usually used (e.g., beryllium copper) causes the diamond cutter to wear very quickly. The single-crystal diamond cutter tool requires unique characteristics: the highest possible hardness, low friction, high stiffness, good thermal conductivity, and an edge that can be sharpened. Because of its sharpness, the diamond cutting edge will transfer any undesired machine motions to the workpiece optical surface. Because of these factors, these specialized diamond tools are not cost effective to produce multi-facet scanners with reasonable yield.

Furthermore, for attaining the required accuracy normally associated with precision machining, the machines must be very stiff, have no lost motion or backlash, have no internal vibrations, be isolated from external vibration, and be thermally stable. In addition, all machine motion must be exceptionally smooth, and the control system must have micro-inch resolution. Such machines must be specially designed and will naturally have a substantially greater cost.

In addition, the width of the facets is limited by a phenomenon ("trapezoidal effect") caused by the single-point diamond flycutter and the geometry of the generated facet. That trapezoidal effect limits the clear aperture of the facets and leaves unfinished the facet-to-facet intersections, which thereby contribute to stray light scatter, not detected by visible inspection but only by system performance and functional tests. The associated expense of such functional tests, required to determine whether to accept or reject the workpiece, is generally considerable. Acceptance only after system testing for such tests usually restricts the yield and thereby disadvantageously requires an excessively large number of scanners to be manufactured and results in costly wastage of completed units. Moreover, a substantial amount of time, typically on the order of at least twelve hours, is required to produce a scanner using the "milling/single-point diamond flycutting" process. Notwithstanding its disadvantages of high cost and restricted potential for quantity production, inner-scanner manufacturers thus far have had to rely primarily on the single-point diamond flycutting process.

Other processes have been evaluated without success, including in particular, the bonded, built-up facet process mentioned above. While this process eliminates the single-point diamond flycutter operation, it is excessively labor intensive; this problem is particularly acute whenever one or more individual facets needs to be reworked. Moreover, the adhesive between the main frame and the facet requires substantial time to cure, on the order of eight to twelve hours. Once the adhesive is cured poor adhesion and potential "peel off" occurrences during subsequent manufacturing procedures and/or uses of the scanner cause problems. Several attempts have been made to promote the required adhesion; however, these attempts either result in only a marginal improvement in adhesion or are too expensive or complex to implement in practice. An inexpensive and simple solution has yet to be found. As a result, considerable time and expense are often disadvantageously consumed in fabricating a reliable inner-scanner by this bonded built-up facet process.

SUMMARY OF THE INVENTION

Accordingly, a principal object of the present invention is to provide a fabrication method for scanner mirrors which improves optical quality and yield substantially.

Another object is to promote such a method which is capable of yielding precise pyramidal angles by producing the facets individually.

A specific object is to provide an advantageous fabrication method which makes the single-point diamond flycutting process unnecessary.

An additional object is to provide such a fabrication method which can easily be used and provides a substantially more economical approach to the fabrication of both conventional and unconventional scanner shapes, in a quantity production environment.

These and other objects are provided in accordance with the present invention, as described below.

DETAILED DESCRIPTION OF THE DRAWINGS

The invention may be more clearly understood from the following detailed description in conjunction with the accompanying drawings, in which FIG. 1 is a top view of a conventional scanner mirror;

DETAILED DESCRIPTION OF THE INVENTION

Figure 1:
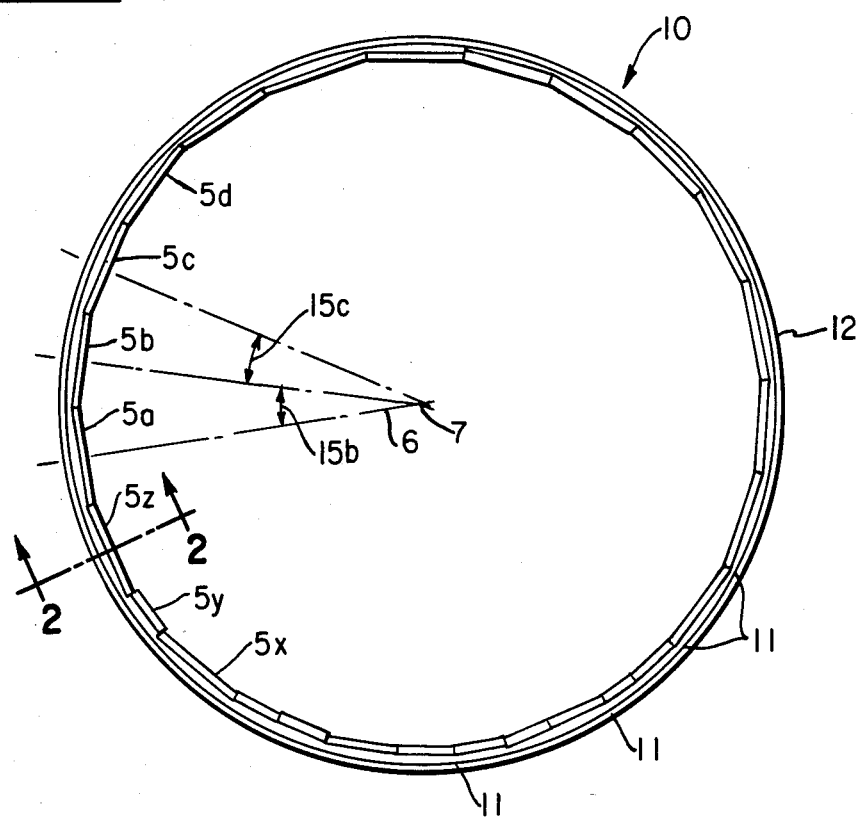
Figure 2:
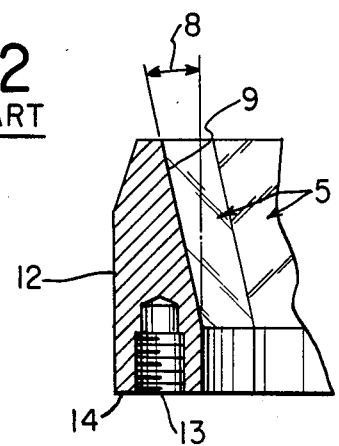
FIG. 2 is a fragmentary cross-sectional view of one facet of the mirror of FIG. 1.

FIGS. 1 and 2 shows a plan view and a representative cross section of a multi-faceted scanner mirror 10 to which the present invention process of fabrication is applicable. The scanner mirror 10 is in the form of a ring 12 formed with a multiplicity of facets $5a$ to $5z$, each having an individual rotational position about ring axis 7 with relation to a reference orientation 6. For example, facet $5a$ may be considered to have a zero rotational angle, and facet $5b$ will have a rotational angle $15a$, facet $5b$ will have a rotational angle $15b$, etc. The individual rotational angle of each facet then defines its position about the periphery of the scanner mirror 10. The facets 5 may have equal arcuate extents or widths about ring axis 7, or may have individual different extents, as shown in FIG. 1, as may be desired for the functioning of the scanner mirror 10 in its system. Each facet has a flat, optical reflecting inner face 9, which is inclined at an individual "pyramidal angle" 8 to the axis 7 of the ring 12, as shown in FIG. 2. The facets meet at intersections or junctions 11, as shown in FIG. 1.

Ring 12 is arranged for suitable mounting on apparatus for rotating it about ring axis 7. In FIG. 2, one form of mounting is shown, in the form of threaded recesses 13, of which a suitable number (e.g. 3 to 5) are located around the bottom face 14 of ring 12. Locating dowel pins or holes to receive them may also be used for accurately positioning the mirror on its mounting. Overall, the scanner mirror may illustratively have a diameter of the order of 6 inches, and an axial extent of the order of 0.5 inch, with faces of the order of ¾ inch or less in peripheral extent.

In use, mirror 10 is rotated about its axis 7, while a beam of suitable radiation is projected to impinge on the inner face of each facet, to be reflected by successive faces as the ring rotates. By virtue of the differing pyramidal angles of the facets, the reflected beam is caused to scan along successive lines in a desired pattern determined by those angles. It will be understood that the number, widths and pyramidal angles of the facets are chosen to provide the desired scanning pattern, which may be interlaced, for example.

For satisfactory operation, a high degree of precision and accuracy is required for the rotational angle of each facet and for its pyramidal angle, and a high value is required for its reflectance over the required spectral range.

Past methods of fabrication have been able to attain such specifications only with difficulty and at excessively high cost. In the past, a ring of copper or beryllium copper or other suitable material has been milled out to the desired shape by milling each individual facet 5, either by a rough mechanical milling or by a wire EDM (electro-discharge machining) process, followed by the single-point diamond flycutting for finishing..

Each of these processes is relatively expensive in that it requires the use of single-point diamond cutters and specialized machine tools to produce the high optical finish and smoothness needed. One disadvantage is that the single-crystal diamond cutter requires unique characteristics (i.e., extremely high hardness, low friction high stiffness, good thermal conductivity and a sharpenable edge) which, with the work materials commonly used, causes the cutting point to wear and deteriorate quickly with use. In addition, because of its sharpness the diamond cutting edge will transfer even minute machine motions (i.e., backlash or lost motion or internal vibration) and will thereby mar the highly precise optical surface of the workpiece. Such machines must therefore be very stiff, with no lost motion or backlash, with no internal vibrations, isolated from external vibrations, and highly thermally stable. All machine motions must be exceptionally smooth, with a control system having a micro-inch resolution. Consequently such machines must be specially designed, and are very costly and time consuming in use.

The wire EDM plus single-point diamond flycutter process is limited by the trapezoidal effect which limits the clear aperture and reflecting surface of the facets and leaves unfinished the facet-to-facet junctions. This contributes to undesirable stray light scatter, undetected by customary visual inspection, but which shows up on final system functional tests, adding to expense by requiring more costly inspection and by discarding of units which fail to attain the required high standards, only after the expense of fabrication has been incurred.

The present invention, in large measure, avoids these disadvantages and permits fabrication of precise and accurate multi-faceted mirror scanners more rapidly and with lower cost.

Figure 3:
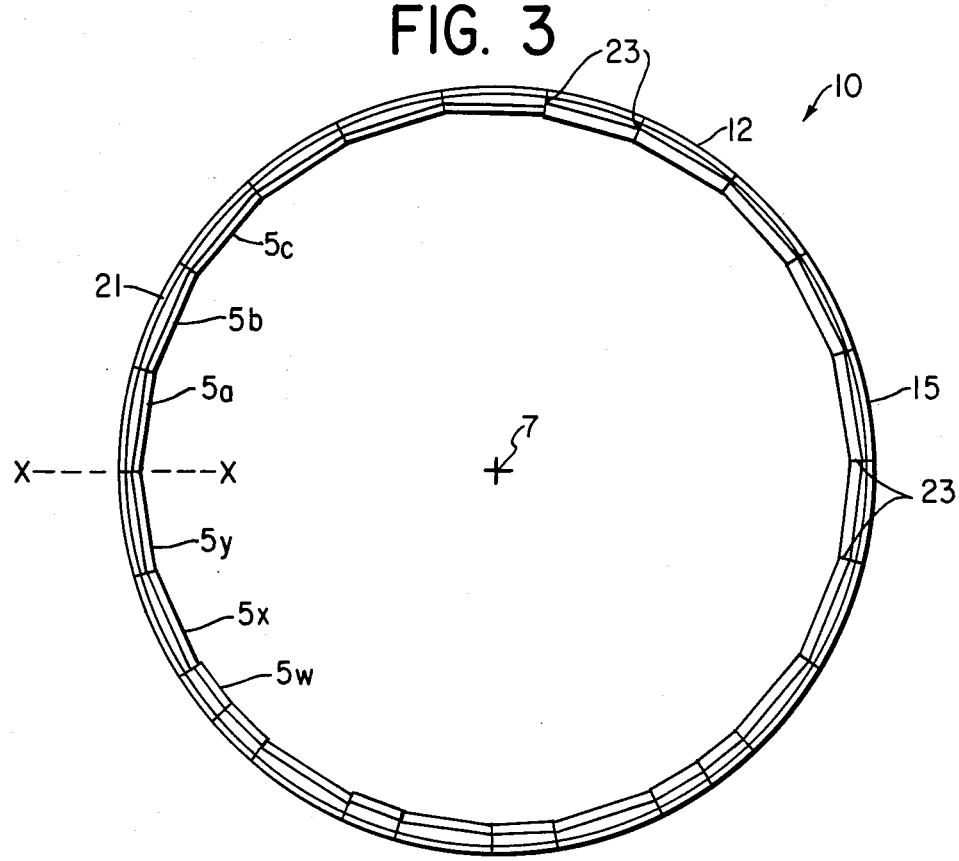
FIG. 3 is a top view of a scanner mirror made by the process of the present invention.

According to the present invention, referring to FIG. 3, the ring 12 is first suitably formed or machined (as by a lathe) to have a cylindrical outer surface 15 extending downwardly to a cylindrical flange 16 have a cylindrical inner surface 17 and a flat shoulder 18. A chamfer 21 may be formed at the outer edge, where desired.

All necessary mounting holes are drilled and tapped as needed, and the workpiece is then stabilized at a suitable temperature range (e.g. 850° to 1050° F.), for a proper period (e.g., four hours) and then air-cooled.

Thereafter, each facet is machined, as by ordinary milling, to essentially the proper pyramidal angle and peripheral extent (rotational angle) providing a version of the final faceted ring. This machining is preferably done by an EDM machine, although other forms of milling machine may be used. A suitable EDM machine is produced by Charmille Technology.

The EDM machine has a fine wire (of the order of 0.002 to 0.010 inch in diameter), suitably energized, which causes metal material adjoining it to be removed, so that it cuts through the metal of the work piece. The wire may be adjusted in position manually or by an automatic numerical control system, about several axes. It is tilted relative to the central axis 7 to provide the desired pyramidal angle. The workpiece is accurately positioned at the desired rotational angle, and either it or the EDM wire is translated parallel to the plane of the ring and perpendicularly to the radius to the center of the facet, for the required facet width, to form the facet. This machining preferably is done to leave the centers of all facets at exactly the same radial distance from the ring axis 7. By way of example, the pyramidal angles may vary from +10 degrees to −10 degrees with a required precision of the order of ±0.010 degree. This machining is designed to leave sufficient thickness of material (of the order of 0.004 inch minimum) for finishing thereafter.

This EDM operation leaves the surface of each facet insufficiently smooth to act as the desired mirror surace. In order to provide the necessary high reflective surface, further polishing (e.g., lapping) is necesary. According to the prior art procedures, this has been done to each facet of the ring in situ, generally by the single-crystal diamond-point flycutter, which has required substantial expert time for obtaining and maintaining proper alignment of the equipment, and has required special arrangements for retaining the work piece in relation to the apparatus during this procedure. In addition, the apparatus has not been able to properly form the facets close to the junction between adjacent facets, leaving a substantial rough region at the joints, which in use limits the usable surface of the facet, and causes erratic specular reflections which may interfere with the desired results during operation of the scanner. Moreover, this process may leave a slight concavity in the facet surface.

According to an important feature of the present invention these disadvantages are avoided. The ring with the unfinished facets is cut (preferably but not necessarily radially) at each junction between adjoining facets, so that each facet becomes an individual piece having a flat facet portion, an arcuate outer surface portion 16, and an inner arcuate flange portion 17. Preferably the severing of the facets is done also by an EDM machine, which provides a very narrow kerf (of the order of 0.004 to 0.012 inch). While the EDM operation is particularly useful here for forming and severing the facets, because it does so without generating heat which would distort the desired flatness and dimensions of the facets, other way of severing the facets may be used, as by thin saws, for example.

Figure 4:
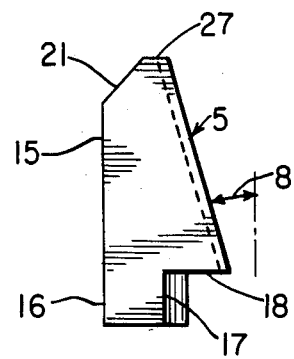
FIG. 4 is a cross sectional view of one facet of the mirror of FIG. 3, at an intermediate stage of fabrication.

Each of the facets is then individually polised by grinding and lapping to the required degree of flatness and smoothness. This can be readily done on conventional polishing or lapping machinery, since the mirror side of each facet is completely flat, and is readily held in relation to the polishing apparatus. Where desired, the facets may be clustered into groups for simultaneous polishing. As indicated generally in FIG. 4, in each polishing operation a predetermined amount of material may be removed (such as of the order of 0.004 inches) to the dotted line 27. Preferably polishing continues until the facet exhibits a specular reflectivity of at least 95% at a wavelength in the desired spectral range. The facets are thereafter washed to remove all vestiges of polishing materials.

After the polishing operation, the polished facets are reassembled in their original cylindrical formation, about a suitable jig or mandrel. One such mandrel may be a cylinder, having an outer diameter equal to the inner diameter of the cylindrical flange 17, with its circumference adjusted for the kerfs removed by the cutting operation, to provide the desired final ring size. Alternatively, the mandrel may be a "negative" of the final scanner mirror, with flat surfaces of the same sizes and angles as the facets of the final mirror. A suitable jig may be formed by molding from a final fabricated ring, as by pouring a liquid material into the ring and allowing the material to solidify. Suitable allowance is made for mold shrinkage. Illustratively, a jig may be made of aluminum, preferably faced with Teflon. A suitable clearance (e.g. about 50 microns) may be provided between jig and the polished workpiece. The polished facets are assembled and held against the jig in the same sequences as they had before severing. By this process, the facets automatically fit together as required, regardless of their differing widths and angles, avoiding difficulties and spoilage incident to assembling individually pre-formed facets.

The assembled facets are then joined together at their meeting surfaces, to constitute a full scanner mirror. Preferably this is done by a process which will strongly join the facets into a solid ring, while inhibiting thermal or mechanical disturbance to or distortion of the individual facets on the ring. This may be done by welding, as by laser jet welding or electron beam welding. One suitable welder is a 400 watt Raytheon 5550 Yag laser machine.

FIG. 3 shows the welded junctions 23 between the successive facets 5, in the completed ring. The laser jet welder is particularly advantageous here, because it welds together the outer edges of the ring segments, without distorting or disturbing the junctions between the segments so that the facet flatness continues up to the actual junction or intersection with an adjoining facet. This overcomes the "trapezoidal effect" of prior art processes; and provides a wider clear reflective surface, in addition to requiring less fabrication time.

Figure 5:
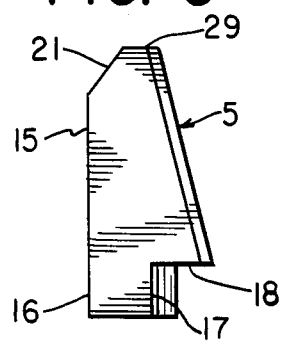
FIG. 5 is a cross-sectional view, similar to FIG. 4, of the final facet.

After welding, the facets may be plated, so as to give a uniformity of reflectance, and to minimize possible surface corrosion or deterioration with time due to environmental factors. A suitable plating material is gold, although other materials may be used, so long as the material strongly adheres to the optical surface and permits at the desired degree of uniform reflectance, such as 95%. A very thin plating is used, to avoid impairing the polished flatness of the facets. FIG. 5 indicates the plated surface at 29.

By this process, the specular scattering at the junctions between adjoining facets is minimized, because the polished and flat facets are juxtaposed closely before and during joining. Any roughness at the junctions left by the EDM milling operation is removed by the severing operation and/or the final polishing.

The prior art single-point diamond cutting process was desired for creating a high polish. However, the usual single-point diamond milling machine at times would cause a minute arcuateness or curvature (e.g. cylindricity or ellipticity) in the surface, which is undesirable for the present high-precision requirement. Also, tool life was not adequate, and failure to recognize when tool wear reached its limit could result in ruining a facet. In turn, impairment of a single facet could require scrapping an entire mirror.

This disadvantage is avoided by the present invention. Even if one facet is spoiled, and assembled before detection, the procedure of severing, polishing to the extent needed, and rewelding, in accordance with the present invention, provides an economical way to repair or re-work a defective facet without wasting the remainder of the mirror.

By avoiding the single-point diamond process, the present invention may be practiced with readily available and relatively inexpensive equipment, thus yielding significant cost savings for that reason. It also provides significantly higher yield by eliminating scatter-light problems of prior art processes, and requires less production time and skill.

This process also facilitates the determination of whether the desired degree of flatness and of reflectance is attained. It is much simpler and less costly to do so individually, with separate facets, than to have to align a complete mirror relative to instrumentation for verifying these parameters.

A feature of this process is that it eliminates any tool pattern of microgrooves on the optical surface, which would deleteriously scatter light from the surface, and undesirably reflect the light in a preferential direction. In this way, the need for a functional test of the complete mirror to confirm facet reflectivity is avoided. The result is a cost-effective fabrication method.

It will be understood that the present process may be used for both inner- and outer-scanner mirrors, of any desired facet configuration. For an outer-scanner, the ring may be in the form of a disk or drum or a cylinder whose outer periphery is faceted. The process described is to be deemed merely illustrative of the principles of the present invention. Many differing processes embodying these principles may be devised without departing from the spirit and scope of the invention, which is defined by the appended claims.

What is claimed is:

1. A method of making a multi-faceted scanner mirror comprising the steps of:
    providing a ring of machinable material;
    forming a plurality of facets on a surface of said ring, each facet having a flat surface, and having an individual width and pyramidal angle relative to the axis of said ring, said facets being distributed around said ring;
    cutting said ring into segments, each segment containing one facet, by cutting said ring at lines between adjoining facets;
    thereafter polishing the flat surfaces of said cut facet segments to a desired flatness and smoothness;
    assembling said polished segments in a ring configuration in the same sequence as their original sequence; and
    joining said polished segments together to reconstitute said faceted ring from said polished segments.

2. A method as in claim 1, wherein said step of forming comprises milling said flat surfaces on the inner surface of said ring.

3. A method as in claim 2 wherein said step of milling is performed by a wire EDM machine.

4. A method as in claim 1 wherein said step of cutting is performed substantially radially of said ring.

5. A method as in claim 1 wherein said step of cutting is performed by a wire EDM machine.

6. A method as in claim 1 wherein said step of joining comprises laser welding.

7. A method of making a multi-faceted scanner mirror comprising the steps of:
    providing a ring of machinable material having an inner surface;
    milling the inner surface of said ring by a wire EDM machine to form a plurality of flat facets on the inner surface of said ring, each facet having an individual width and pyramidal angle relative to the axis of said ring, said facets being successively adjoining one another, with a line of intersection between each adjoining pair of facets;
    cutting said ring into segments, each segment containing one facet, by cutting said ring radially by means of a wire EDM machine at the line of intersection between each pair of adjoining facets;
    polishing the flat surfaces of said facet segments to a desired flatness and smoothness;
    assembling said polished segments in a ring configuration in the same sequence as their original sequence; and
    joining said polished segments together to reconstitute said faceted ring from said polished segments, said step of joining including laser-welding adjoining assembled segments together.

8. A method of making a multi-faceted scanner mirror, comprising the steps of;
    providing a piece of machinable material having a plurality of facets in a ring arrangement on a surface of said piece, each facet having a flat surface and an individual width and pyramidal angle relative to an axis of said piece, at least some of said facets being successively adjoining one another, with a line of intersection between each adjoining pair of facets;
    cutting said ring to form at least one segment having a flat surface by cutting said piece at at least two lines of intersection between two pairs of adjoining facets;
    polishing the flat surface of each said cut segment to a desired flatness and smoothness;
    assembling each said polished segment in a ring configuration with the remainder of said ring arrangement in the same sequence as it had in the original arrangement; and
    joining each said polished segment together with the remainder of said piece to reconstitute said faceted ring arrangement.

9. A method as in claim 8, wherein said step of cutting is performed substantially radially of said ring arrangement.

10. A method as in claim 9 wherein said step of cutting is performed by a wire EDM machine.

11. A method as in claim 8 wherein said step of joining comprises laser welding.

12. A multi-faceted mirror scanner made by any of the methods of claims 1 through 11.

13. A method of making a multi-faceted scanner mirror from a piece of machinable material having a plurality of facets in a ring arrangement on a surface of said piece, each facet having a flat surface and an individual width and pyramidal angle relative to an axis of said ring arrangement, at least some of said facets being successively adjoining one another, with a line of intersection between each adjoining pair of facets, said method comprising the steps of:

cutting said ring to form at least one segment having a flat surface by cutting said piece at at least two lines of intersection between facets;

polishing the flat surface of each said cut segment to a desired flatness and smoothness;

assembling each said polished segment in a ring configuration with the remainder of said ring arrangement, in the same sequence as in the original ring arrangement; and joining each said polished segment to the remainder of said piece to reconstitute said faceted ring arrangement with polished surfaces.

* * * * *